(12) United States Patent
Swinderman

(10) Patent No.: US 6,575,292 B2
(45) Date of Patent: *Jun. 10, 2003

(54) CONVEYOR BELT CLEANER AND TENSIONER ASSEMBLY

(75) Inventor: R. Todd Swinderman, Kewanee, IL (US)

(73) Assignee: Martin Engineering Company, Neponset, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/058,486

(22) Filed: Jan. 28, 2002

(65) Prior Publication Data

US 2002/0070096 A1 Jun. 13, 2002

Related U.S. Application Data

(63) Continuation of application No. 09/524,925, filed on Mar. 14, 2000, now Pat. No. 6,374,991.
(60) Provisional application No. 60/125,167, filed on Mar. 19, 1999.

(51) Int. Cl.[7] .............................................. B65G 45/00
(52) U.S. Cl. ....................................................... 198/499
(58) Field of Search ................................. 198/497, 499

(56) References Cited

U.S. PATENT DOCUMENTS

| | | |
|---|---|---|
| 4,402,394 A | 9/1983 | Stoll |
| 4,520,917 A | 6/1985 | Sillivent et al. |
| 4,917,231 A | 4/1990 | Swinderman |
| 4,969,553 A | 11/1990 | Stoll |
| 5,007,523 A | 4/1991 | Morefield |
| 5,114,000 A | 5/1992 | Rappen |
| 5,222,588 A | 6/1993 | Gordon |
| 5,222,589 A | 6/1993 | Gordon |
| 5,248,026 A | 9/1993 | Morefield |
| 5,722,528 A | 3/1998 | Dolan |
| 5,944,167 A | 8/1999 | Brink |
| 5,975,281 A | 11/1999 | Yoshizako et al. |
| 6,082,524 A * | 7/2000 | Brink .......................... 198/499 |
| 6,374,991 B1 * | 4/2002 | Swinderman ............... 198/499 |

FOREIGN PATENT DOCUMENTS

| | | |
|---|---|---|
| AU | 33191/95 | 10/1995 |
| DE | 8810707.8 | 11/1988 |
| DE | 8619552 | 2/1994 |
| DE | 29507865 | 8/1995 |
| EP | 0497324 | 8/1992 |
| WO | WO 96/33113 | 10/1996 |
| ZA | 886101 | 8/1988 |

OTHER PUBLICATIONS

English translation of German Patent No. 29507865.
SUSPA Incorporated, Publication for Series 16 Definitions and Operation.
Patent Abstract of Japan, Publication No. 08132018, May 28, 1996.
Patent Abstract of Japan, Publication No. 59194927, Nov. 5, 1984.

* cited by examiner

Primary Examiner—Joseph E. Valenza
(74) Attorney, Agent, or Firm—Barnes & Thornburg

(57) ABSTRACT

A conveyor belt cleaner and tensioner assembly adapted to be attached to a cross shaft. The conveyor belt cleaner and tensioner assembly includes a mounting base adapted to be mounted to the cross shaft and an arm member having a first end and a second end. The first end of the arm member is pivotally attached to the mounting base for pivotal movement about a pivot axis. A scraper blade is attached to the second end of the arm member. A gas spring tensioner has a first end pivotally attached to the mounting base and a second end pivotally attached the arm member. The tensioner includes a housing and a ram having a first end located within the housing and a second end located externally of the housing. The ram is extendable and retractable with respect to the housing to thereby pivot the arm member and the scraper blade about the pivot axis. The scraper blade includes a metal scraping tip having an elastomeric wear-in tip.

11 Claims, 5 Drawing Sheets

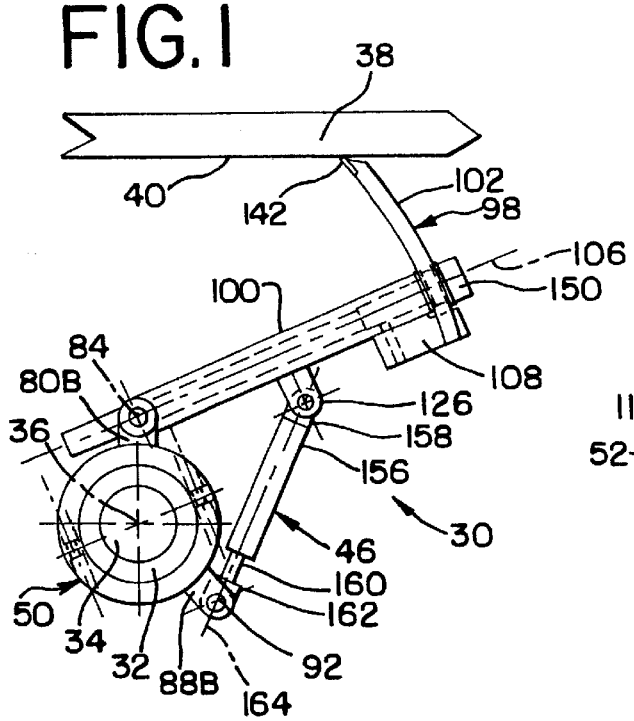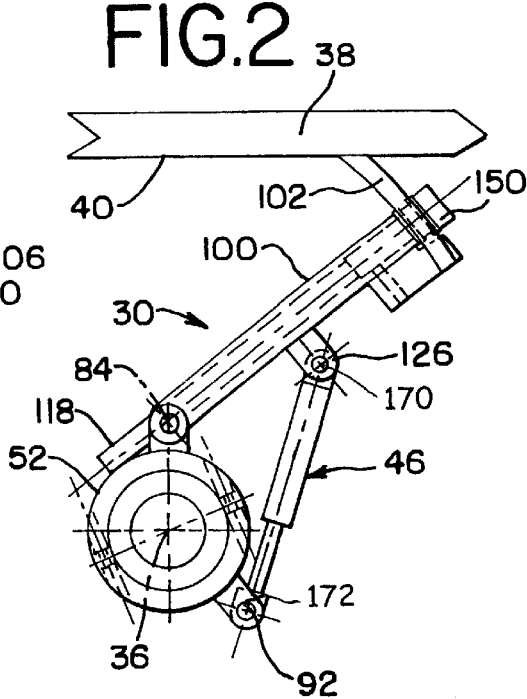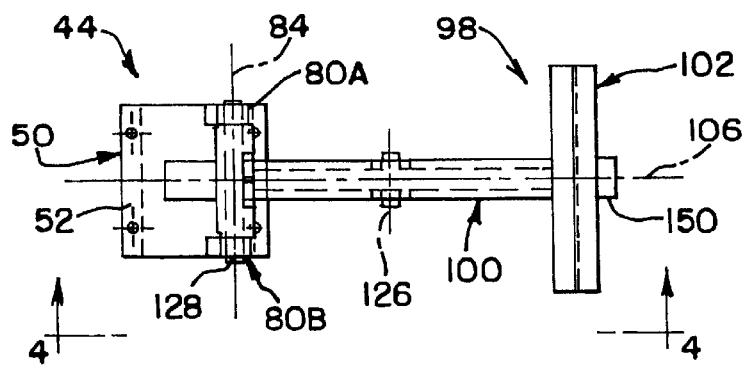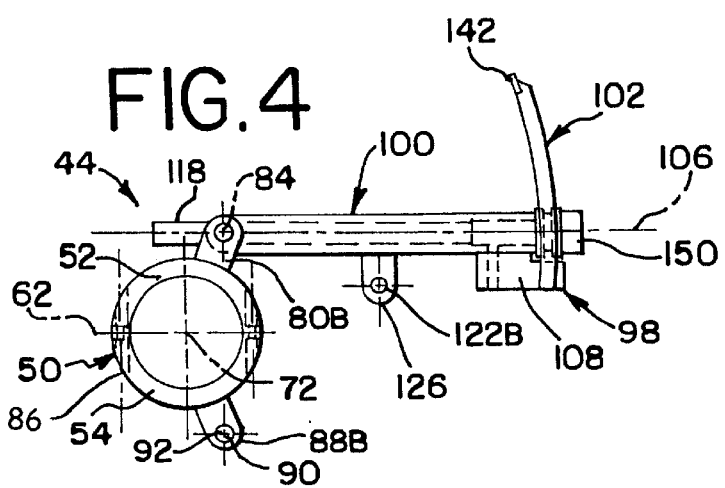

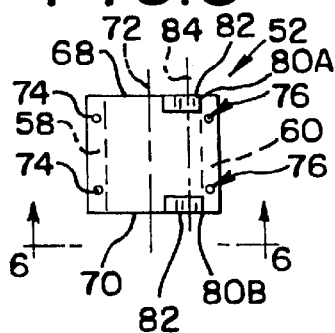

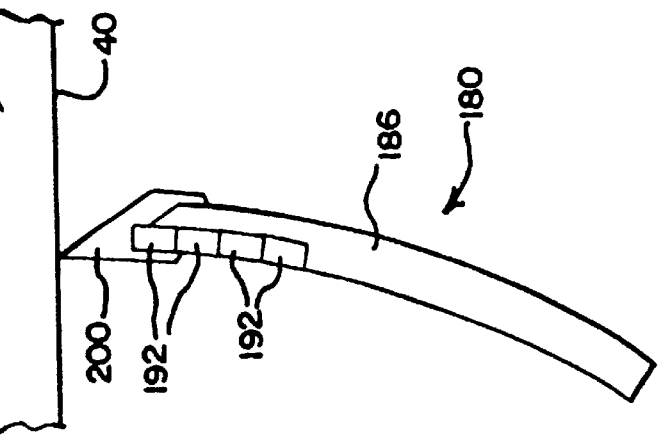
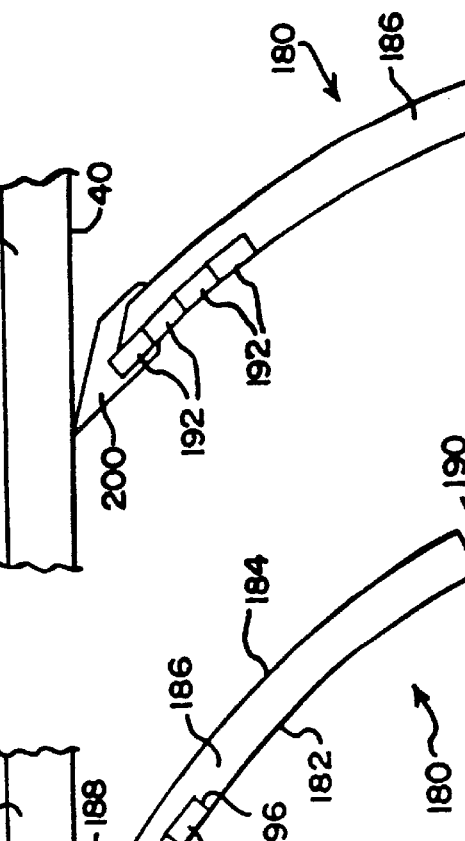
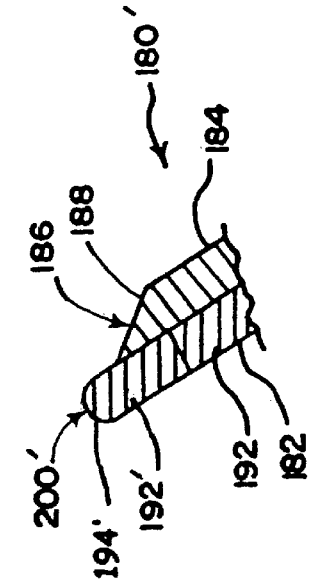
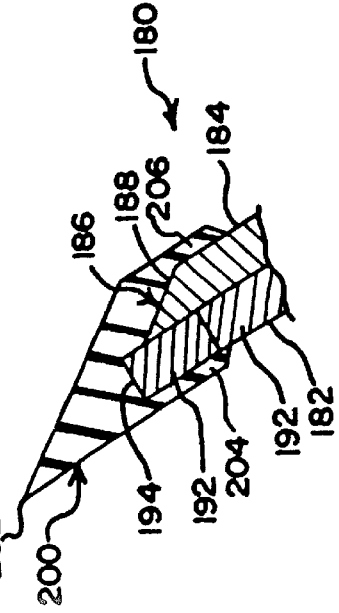

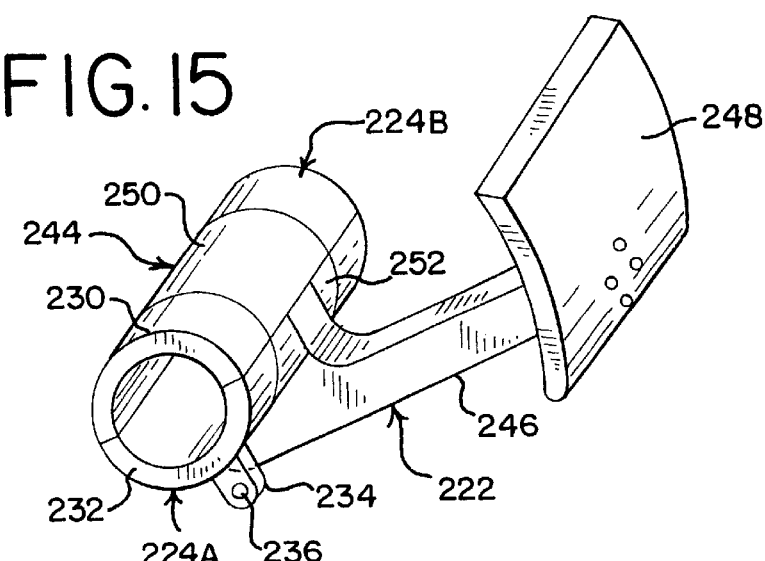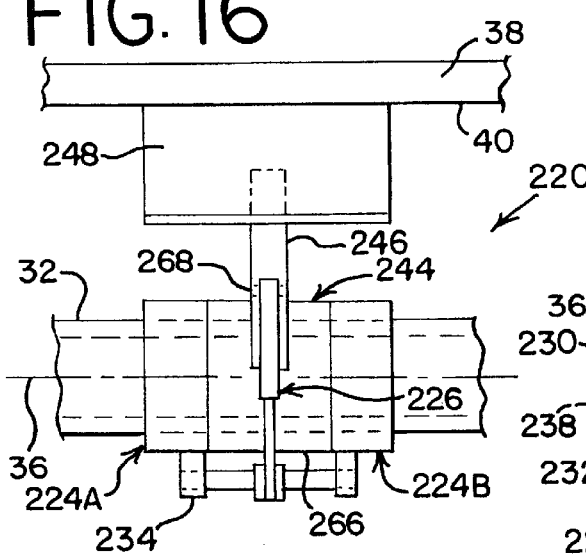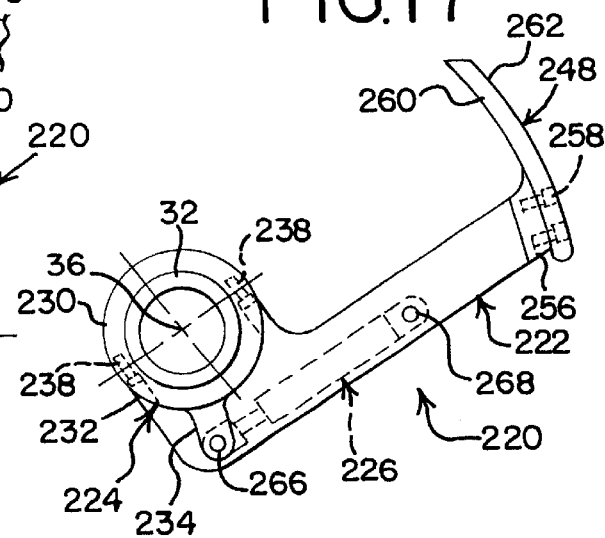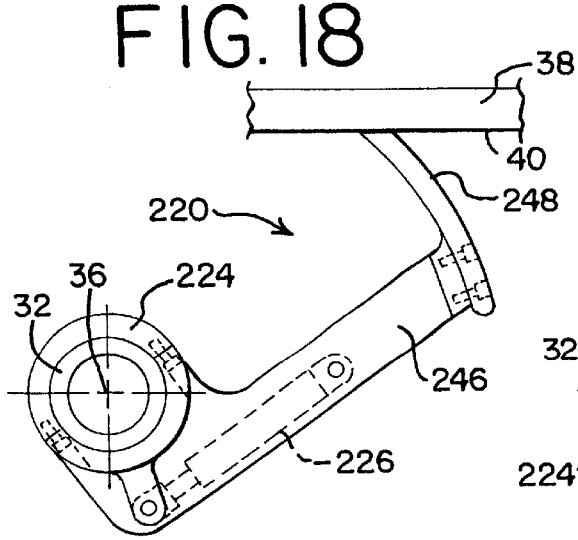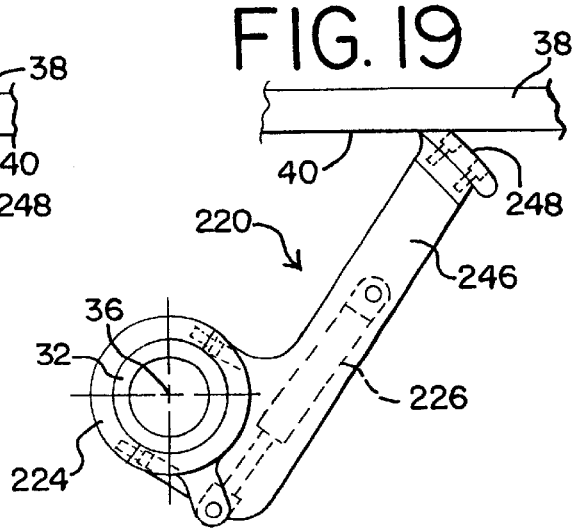

CONVEYOR BELT CLEANER AND TENSIONER ASSEMBLY

This application is a continuation of U.S. application Ser. No. 09/524,925, filed Mar. 14, 2000, now U.S. Pat. No. 6,374,991, which claims the benefit of U.S. Provisional Application No. 60/125,167 filed Mar. 19, 1999.

BACKGROUND OF THE INVENTION

The present invention is directed to a conveyor belt cleaner and tensioner assembly including a conveyor belt cleaner having a scraper blade that provides a constant cleaning angle with a conveyor belt and that is resiliently biased into cleaning engagement with the conveyor belt by a tensioner mechanism.

Conveyor belts transport various types of bulk material such as sand, coal, grain and ores. Conveyor belt cleaners remove conveyed material that continues to adhere to the rotating conveyor belt after the remainder of the conveyed material has been discharged. A scraper blade of a conveyor belt cleaner can be orientated with respect to the surface of the conveyor belt at an obtuse or negative angle, which is referred to as a "peeling" angle, or the scraper blade can be orientated at an acute or positive angle with respect to the conveyor belt which is referred to as a "scraping" angle. It has been found that scraper blades used in connection with conveyor belts conveying certain bulk materials with fines, such as ores, clean the conveyor belt more efficiently when the scraper blades are orientated at a peeling or negative angle with respect to the conveyor belt, rather than at a scraping or positive angle.

Current belt cleaners that have scraper blades disposed at a peeling angle are prone to vibrate or chatter against the belt which lowers the cleaning efficiency of the belt cleaner and can cause damage to the conveyor belt and to the belt cleaner. Another problem with peeling angle scraper blades is that the scraper blades must be precisely aligned with the belt to avoid damaging the belt, and it is difficult to achieve the desired belt to scraper blade contact during installation of a conveyor belt cleaner. Belt damage usually results when one corner of a scraper blade is in engagement with the conveyor belt rather than the entire scraper blade contact area.

A problem that is encountered by both peeling angle and scraping angle conveyor belt cleaners is the tendency of the conveyor belt cleaner or the belt to become damaged when the conveyor belt reverses direction or "rolls back" momentarily. Conveyor belt reversal or roll back happens frequently when the conveyor belt goes through a normal shutdown sequence. The belt thereafter rolls backward from a few inches to a few feet as the belt tension relaxes. This roll back motion tends to catch the scraper blade, forcing the blade backward and bending the arm on which the scraper blade is mounted, or otherwise causing the scraper blade to swivel out of alignment. Sometimes the scraper blades do not swivel back into their original cleaning position when the conveyor belt is restarted, or the damage is so severe to the arm that the belt cleaner no longer functions. Even worse is the potential for damaging the belt when it resumes forward motion if the scraper blade is locked in a position where only a corner of the scraper blade is in engagement against the belt.

The preferred peeling angle or scraping angle with which a scraper blade engages the conveyor belt varies depending upon the type or grade of materials that are being conveyed. Conveyor belt cleaners are typically designed for operating optimally at a single peeling angle or scraping angle and are not adjustable to provide changes in peeling angle or scraping angle to accommodate changes in the type or grade of conveyed material.

Conveyor belt cleaners have also required the use of external tensioners that include a rubber or elastomeric torsion member that is twisted to store a rotational biasing force which pivots the scraper blades into biased engagement with the conveyor belt. These external tensioners add expense to the conveyor belt cleaner, and if the external tensioner fails, all of the scraper blades of the conveyor belt cleaner will fall away from, and out of cleaning engagement with, the conveyor belt. External tensioners also often need to be re-tensioned during the life of the scraper blades as they provided a non-linear output force over their range of operation.

SUMMARY OF THE INVENTION

A conveyor belt cleaner and tensioner assembly adapted to be attached to a cross shaft. The conveyor belt cleaner and tensioner assembly includes a mounting base adapted to be mounted to the cross shaft, and an arm member having a first end and a second end. The first end of the arm member is pivotally attached to the mounting base and thereby to the cross shaft for pivotal movement about a first pivot axis. A scraper blade is attached to the second end of the arm member. A tensioner mechanism includes a first end pivotally attached to the mounting base and a second end pivotally attached to the arm member. The tensioner mechanism is preferably a gas spring tensioner including a housing having a cavity and a ram having a first end located within the housing and a second end located externally of the housing. The ram is extendable and retractable with respect to the housing to thereby pivot the arm member and the scraper blade with respect to the mounting base about the pivot axis. The scraper blade is removably attached to the second end of the arm member and is pivotal with respect to the arm member about a second pivot axis that is generally perpendicular to the first pivot axis. The scraper blade includes an arc-shaped inner surface and an arc-shaped outer surface, each of which is formed by a respective radius which extends from the first pivot axis.

BRIEF DESCRIPTION OF THE DRAWING FIGURES

FIG. 1 is a side elevational view of one embodiment of the scraper blade and gas spring tensioner assembly of the present invention shown with a new scraper blade.

FIG. 2 is a side elevational view of the conveyor belt cleaner and gas spring tensioner assembly of FIG. 1 shown with a worn scraper blade.

FIG. 3 is a top plan view of the conveyor belt cleaner of the conveyor belt cleaner and gas spring tensioner assembly.

FIG. 4 is a side elevational view of the conveyor belt cleaner taken along line 4—4 of FIG. 3.

FIG. 5 is a top plan view of a mounting member of the conveyor belt cleaner.

FIG. 6 is a side elevational view taken along line 6—6 of FIG. 5.

FIG. 7 is a top plan view of the arm member of the conveyor belt cleaner.

FIG. 8 is a side elevational view of the arm and blade member of the conveyor belt cleaner.

FIG. 9 is a front elevational view of the scraper blade of the conveyor belt cleaner.

FIG. 10 is a side elevational view taken along line 10—10 of FIG. 9.

FIG. 11 is a partial cross-sectional view of the gas spring tensioner.

FIG. 12A is a side elevational view of a modified embodiment of a scraper blade shown in a first peeling angle with respect to a conveyor belt.

FIG. 12B is a side elevational view of the scraper blade of FIG. 11 shown in a second peeling angle with respect to the conveyor belt.

FIG. 13 is a side elevational view of the scraper blade of FIG. 11 shown in a scraping angle with respect to the conveyor belt.

FIG. 14 is an enlarged partial cross-sectional view of the scraping tip of the modified embodiment of the scraper blade.

FIG. 14A is an enlarged partial cross-sectional view of a modified scraping tip.

FIG. 15 is a perspective view of the conveyor belt cleaner of a modified embodiment of a conveyor belt cleaner and gas spring tensioner assembly.

FIG. 16 is a front elevational view of the modified embodiment of the conveyor belt cleaner and gas spring tensioner assembly including the conveyor belt cleaner as shown in FIG. 15.

FIG. 17 is a side elevational view of the conveyor belt cleaner and gas spring tensioner assembly.

FIG. 18 is a side elevational view of the conveyor belt cleaner and gas spring tensioner assembly shown with a new scraper blade.

FIG. 19 is a side elevational view of the conveyor belt cleaner and gas spring tensioner assembly shown with a worn scraper blade.

DETAILED DESCRIPTION OF THE PREFERRED EMBODIMENTS

Figure 20:
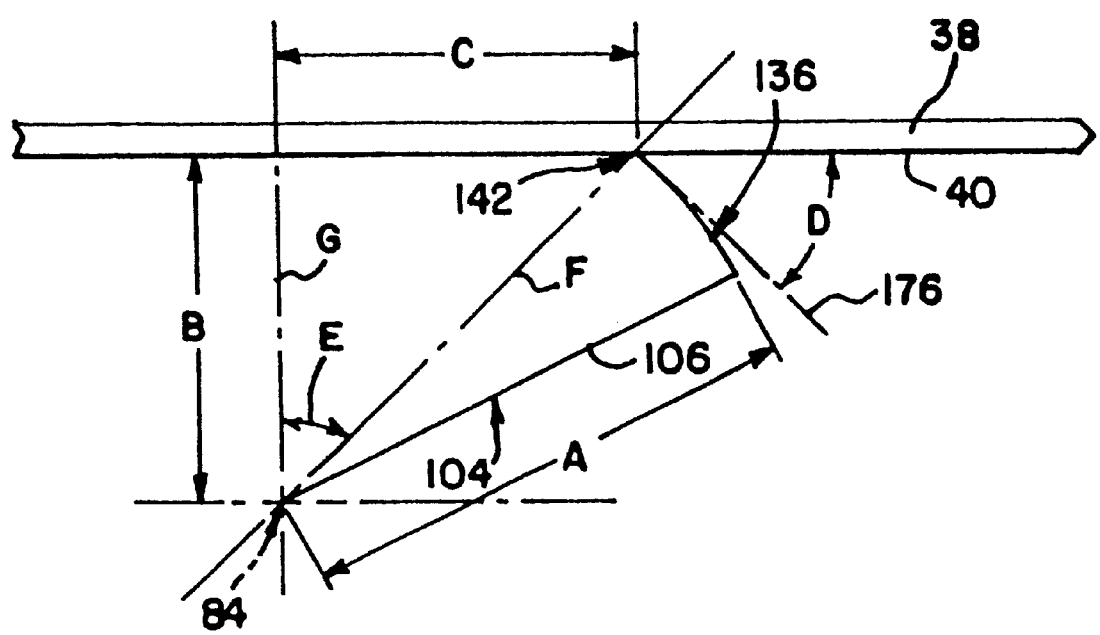
FIG. 20 is a schematic diagram illustrating how the cleaning angle of the scraper blade of the present invention is determined.

One embodiment of the conveyor belt cleaner and tensioner assembly of the present invention is shown in FIGS. 1–10 and is identified with the reference number 30. As shown in FIGS. 1 and 2, the conveyor belt cleaner and tensioner assembly 30 is attached to and supported by an elongate cross shaft 32. The cross shaft 32 is a tubular member, such as a circular pipe, that includes a generally circular longitudinal bore 34 extending between the ends of the cross shaft 32. The cross shaft 32 and the bore 34 include a longitudinal central axis 36. The cross shaft 32 is preferably mounted at each end to a respective stationary structure such as a conveyor chute. The cross shaft 32 is mounted to the stationary structure such that the cross shaft 32 may be selectively rotated about the central axis 36 and may be selectively locked in place to prevent rotation about the central axis 36. Alternatively, the cross shaft 32 can be mounted to be linearly adjustable.

The conveyor belt cleaner and tensioner assembly 30 is shown in FIGS. 1 and 2 in engagement with a moving conveyor belt 38 having an outer surface 40. The belt 38 illustrated in FIGS. 1 and 2 is moving in a left to right direction as indicated by the arrow or pointed end of the conveyor belt 38. The conveyor belt cleaner and tensioner assembly 30 may be used as a secondary cleaner, such as shown in FIGS. 1 and 2, wherein the conveyor belt cleaner and tensioner assembly 30 engages the return run of the conveyor belt 38, or the conveyor belt cleaner and tensioner assembly 30 may be used as a primary conveyor belt cleaner wherein the conveyor belt cleaner and tensioner assembly 30 engages the conveyor belt 38 at the head pulley of the conveyor.

The conveyor belt cleaner and tensioner assembly 30 includes a conveyor belt cleaner 44 and a conveyor belt cleaner tensioner 46. The conveyor belt cleaner 44, as best shown in FIGS. 3 and 4, includes a mounting base 50 including an upper mounting member 52 and a lower mounting member 54. As best shown in FIGS. 5 and 6, the upper mounting member 52 includes a generally semi-circular sleeve 56 having a first generally planar end wall 58 and a spaced apart second generally planar end wall 60. The first and second end walls 58 and 60 extend generally parallel to one another and are located in a common plane 62. The sleeve 56 includes a generally semi-circular outer surface 64 and a generally semicircular inner surface 66, each of which extend from the first end wall 58 to the second end wall 60. The sleeve 56 includes a first side wall 68 and a spaced apart and generally parallel second side wall 70. A central axis 72 is located in the plane 62 midway between and generally parallel to the end walls 58 and 60. The outer surface 64 and the inner surface 66 are each formed about a respective radius from the central axis 72. A pair of spaced apart and generally parallel bores 74 extend from the first end wall 58 through the outer surface 64 in a direction generally perpendicular to the first end wall 58 and the plane 62. A second pair of spaced apart and generally parallel bores 76 extend through the second end wall 60 and the outer surface 64 in a direction generally perpendicular to the second end wall 60 and the plane 62. The bores 74 and the bores 76 are located in a generally rectangular configuration with respect to one another.

The mounting member 52 also includes a mounting lug 80A and a spaced apart and generally parallel mounting lug 80B. Each mounting lug 80A and B includes a first end that is attached to the outer surface 64 of the sleeve 56 and a second end including a generally circular aperture 82. The mounting lug 80A is attached to the outer surface 64 adjacent the first side wall 68 and the mounting lug 80B is attached to the outer surface 64 adjacent to the second side wall 70. The aperture 82 of the mounting lug 80A and the aperture 82 of the mounting lug 80B are concentrically located about a pivot axis 84. As shown in FIG. 6 the pivot axis 84 is generally parallel to the central axis 72 and is located at an angle of approximately 67.5° to the plane 62 as measured about the central axis 72.

The lower mounting member 54 of the mounting base 50 is constructed substantially identical to the upper mounting member 52. As shown in FIG. 4, the lower mounting member 54 includes a generally semi-circular sleeve 86 and a pair of mounting lugs 88A and B that are attached to the sleeve 86. Each mounting lug 88A and B includes a circular aperture 90. Each aperture 90 is concentrically located about a pivot axis 92 that is generally parallel to the central axis 72. The pivot axis 92 is located at an angle of approximately 67.5° to the plane 62 as measured about the central axis 72.

As best shown in FIGS. 1 and 2, the upper mounting member 52 and the lower mounting member 54 are placed around the cross shaft 32 such that the inner surface 66 of the mounting members 52 and 54 engage the outer surface of the cross shaft 32. The end walls 58 and 60 of the respective mounting members 52 and 54 are spaced slightly apart from one another. Fasteners extend through the bores 74 and 76 in the upper mounting member 52 and through the bores 74 and 76 in the lower mounting member 54. The fasteners tighten and clamp the upper mounting member 52 and the lower mounting member 54 to the cross shaft 32 such that the mounting base 50 is stationarily clamped to the cross shaft 32 for conjoint rotation with the cross shaft 32. The mounting base 50 does not rotate with respect to the cross shaft 32. As shown in FIG. 1, the upper mounting member 52 is connected to the lower mounting member 54 such that the apertures 82 in the mounting lugs 80A and B and the pivot axis 84 are located at an angle of approximately 135° to the apertures 90 of the mounting lugs 88A and B and the pivot axis 92 as measured about the axis 36.

The conveyor belt cleaner 44 also includes an arm and blade assembly 98 as shown in FIG. 8 having an arm member 100 and a scraper blade 102 that is pivotally attached to the arm member 100. As best shown in FIGS. 7 and 8, the arm member 100 includes an elongate shaft 104 having a longitudinal central axis 106. The shaft 104 comprises a tubular member having a longitudinal bore 105. The outer end of the shaft 104 includes a threaded bore 107 located concentrically along the axis 106. A bracket 108 is attached to the outer end of the shaft 104 and extends radially outwardly from the shaft 104. The bracket 108 includes a tab 109 that projects outwardly beyond the outer end of the shaft 104 in a direction parallel to the axis 106. The bracket 108 also includes a threaded bore 110 that is in communication with the threaded bore 107 and that is generally perpendicular to the axis 106. A threaded set screw is located in the bore 110.

A tubular sleeve 112 is attached transversely to the second end of the shaft 104. The tubular sleeve 112 includes a generally circular bore 114 having a central longitudinal axis 116. A stop shaft member 118 is attached to the tubular sleeve 112 and extends outwardly from the tubular sleeve 112 concentrically along the axis 106 to an outer end 120. The stop member 118 is attached to the tubular sleeve 112 on a diametrically opposite side from the shaft 104. The stop member 118 may include a set screw or other adjustment mechanism for adjusting the gap between the stop member 118 and the sleeve 112 to accommodate different mounting positions and blade configurations. A pair of spaced apart and generally parallel mounting lugs 122A and B are attached to the shaft 104. Each mounting lug 122A and B includes an aperture 124. The apertures 124 in the mounting lugs 122A and B are concentrically located about a pivot axis 126. The pivot axis 126 is generally parallel to the axis 116.

As shown in FIGS. 3 and 4, the arm member 100 is pivotally connected to the mounting base 50 for pivotal movement about the pivot axis 84. The tubular sleeve 112 of the arm member 100 is located between the mounting lugs 80A and 80B of the upper mounting member 52 such that the bore 114 is aligned with the apertures 82 and such that the axis 116 is generally coaxial with the pivot axis 84. A generally cylindrical pin 128 extends through the apertures 82 in the mounting lugs 80A and B and through the bore 114 of the sleeve 112 to pivotally connect the arm member 100 to the mounting base 50 for selective pivotal movement about the pivot axis 84 and the coaxial axis 116. The pin 128 is preferably made from a metal such as bronze. The arm member 100 is preferably made from a metal such as steel.

The scraper blade 102 of the arm and blade assembly 98 as best shown in FIGS. 9 and 10 is generally formed as a curved plate. The scraper blade 102 includes a mounting base 130 having an aperture 132 that is adapted to be aligned with the threaded bore 107 in the end of the shaft 104 of the arm member 100. The mounting base 130 also includes an open-end slot 131 in the bottom end of the mounting base 130. The slot 131 includes opposing side walls 133A and B that are disposed at an angle, such as fifteen degrees, to one another. The slot 131 is adapted to receive the tab 109 of the bracket 108 of the arm 100. The scraper blade 102 includes a scraping tip 134 attached to the mounting base 130. The scraping tip 134 includes a wear resistant scraping element 135 that may be formed from tungsten carbide, a ceramic material, or the like. The scraper blade 102 includes a generally concave inner surface 136 that is shaped to conform generally to an arc of a circle. The inner surface 136 extends from the top end of the scraping tip 134 to the bottom end of the mounting base 130. The scraper blade 102 also includes a generally convex outer surface 138 that conforms generally to an arc of a circle. The outer surface 138 is generally spaced equidistantly from the inner surface 136. The inner surface 136 and the outer surface 138 are both formed as an arc of a circle wherein each circle has the same center point, with the center point being located on the coaxial axes 84 and 116. The inner surface 136 and the outer surface 138 are each formed by a respective radius extending from the coaxial axes 84 and 116. In one configuration of the scraper blade 102 the inner surface 136 is formed as an arc of a circle having a radius of approximately 245.4 millimeters and the outer surface 138 is formed as an arc of a circle having a radius of approximately 257.9 millimeters, wherein each radius originates from the same center point on the pivot axis 84.

The scraping tip 134 includes a generally planar end wall 140 that extends from the outer surface 138 to the scraping element 135. The outer edge of the scraping element 135 forms a generally linear scraping edge 142 at the upper end of the inner surface 136. The end wall 140 is located at an angle of approximately 135° with respect to a plane 144 that extends through the scraping edge 142 and the bottom edge of the inner surface 136 as measured about the scraping edge 142. The scraper blade 102 includes a first side wall 146 and a spaced apart and generally parallel second side wall 148. The mounting base 130 of the scraper blade 102 includes a generally planar and circular recess 149 located at each end of the aperture 132, respectively formed in the inner surface 136 and the outer surface 138. A bushing 150 having a circular aperture 151 is located in the aperture 132.

As best shown in FIG. 8, the scraper blade 102 is removably and pivotally attached to the outer end of the shaft 104 of the arm member 100 by a fastener 150, such as a bolt, that extends through the aperture 132 and the aperture 151 in the bushing 150 such that the scraper blade 102 can pivot or swivel about the axis 106 and about the shank of the fastener 150 with respect to the arm member 100. The set screw in the bore 110 is fastened against the shank of the fastener 150 to prevent the fastener 150 from rotating about the axis 106. The scraper blade 102 can swivel approximately 7.5° about the axis 106 in either direction from a neutral position wherein the tab 109 is located within the slot 131 midway between the side walls 133A and B, for a total of 15° of movement. The scraper blade 102 can pivot or swivel about the axis 106 until the side wall 133A or 133B engages the tab 109. The scraper blade 102 can thereby swivel about the axis 106 within limits to align with the surface 40 of the belt 38 and to adjust to changes in the configuration of the belt 38.

The scraper blade 102 is preferably mounted to the arm member 100 such that the respective circles or radii that form the inner surface 136 and the outer surface 138 have a common center point located on the pivot axis 84. The inner surface 136 and the outer surface 138 will therefore both maintain a constant angle of cleaning engagement with the outer surface 40 of the conveyor belt 38 as the scraping tip 134 of the scraper blade 102 wears due to its engagement with the rotating belt. The scraper blade 102 may be made from a metal, such as T-1 steel or tungsten-carbide, a ceramic material, or an elastomeric material such as urethane.

The conveyor belt cleaner tensioner 46 as shown in FIG. 11 includes a generally cylindrical housing 156 having an elongate generally cylindrical cavity formed therein. A mounting lug 158 having an aperture formed therein is attached to a first end of the housing 156. An elongate generally cylindrical ram 160 has a first end located within the cavity of the housing 156 and a second end which projects outwardly from the housing 156. The first end of the ram 160 slidably engages the wall of the cavity and includes a valve. A mounting lug 162 including a generally circular aperture is attached to the second end of the ram 160. The ram 160 includes a central longitudinal axis 164. The central axes of the apertures in the mounting lugs 158 and 162 are generally parallel to one another and extend through the central axis 164. The ram 160 is slidable with respect to the housing 156 along the central axis 164 such that the ram 160 is selectively extendable, wherein the mounting lug 162 is moved away from the housing 156, and such that the ram 160 is selectively retractable, wherein the mounting lug 162 is moved closer to the housing 156.

The mounting lug 158 of the housing 156 is pivotally attached to the mounting lugs 122A and B of the arm member 100 by a generally cylindrical pin 170. The pin 170 extends through the apertures 124 in the mounting lugs 122A and B and the aperture in the mounting lug 158. The tensioner 46 is thereby pivotally moveable with respect to the arm and blade assembly 98 about the pivot axis 126. The mounting lug 162 of the ram 160 is pivotally attached to the mounting lugs 88A and B of the lower mounting member 54 by a generally cylindrical pin 172. The pin 172 extends through the apertures 90 in the mounting lugs 88A and B and the aperture in the mounting lug 162. The tensioner 46 is thereby pivotally moveable with respect to the mounting base 50 about the pivot axis 84. The pins 170 and 172 are preferably made from metal such as brass. As best shown in FIGS. 1 and 2, the pivot axes 84, 92 and 126 are generally parallel to one another and are located in a generally triangular position with respect to one another.

A preferred conveyor belt cleaner tensioner 46 is a hydropneumatic linear actuator commonly referred to as a gas spring tensioner as shown in FIG. 11 that has an approximately linear relationship between the position of the ram 160 and the force output. A preferred gas spring tensioner is manufactured by AVM under Model No. AHP 6240. A gas spring tensioner provides a nearly constant linear force output between a first fully retracted position of the ram 160 and a second fully extended position of the ram 160. The approximately constant magnitude of force provided by the gas spring tensioner 46, in combination with the configuration of the scraper blade 102 and the manner in which the scraper blade 102 is connected to the arm member 100 for pivotal movement about the pivot axis 84, enables the scraper blade 102 to engage the conveyor belt 38 with an approximately constant cleaning pressure between the scraper blade 102 and the outer surface 40 of the conveyor belt 38 over the wear life of the scraper blade 102. The tensioner 46 may alternatively comprise an electromagnetic actuator or a constant force mechanical spring which provide a generally constant output force over their operating range.

The gas spring tensioner 46 includes a compressed gas 166, such as nitrogen, and liquid 168, such as hydraulic oil, located within the cavity of the housing 156. The liquid 168 functions to dampen the movement of the ram 160. Dampened movement of the ram 160 with respect to the housing 156 reduces the vibration or chatter of the scraper blade 102 against the conveyor belt 38 that scraper blades orientated at a peeling angle are otherwise generally prone to generate. As the gas spring tensioner 46 dampens the tendency of the scraper blade 102 to vibrate, the scraper blade 102 can be used over a large range of different peeling angles. The scraper blade 102 may therefore be used at the optimum cleaning angle for a particular set of conditions as determined by variables such as belt speed, belt condition and the type of material conveyed The ram 160 in the gas spring tensioner 46 has a time reaction constant that is significantly longer than that of the rubber or elastomeric torsion springs that have typically been used for tensioning secondary conveyor belt cleaners. The conveyor belt cleaner 44 is therefore much less likely to be adversely affected by conveyor belt roll back than are conveyor belt cleaners that are tensioned by torsion springs. As shown in FIGS. 1 and 2, the scraper blade 102 is orientated at a 45° negative peeling angle with respect to the conveyor belt 38. In applications where belt roll back is a problem, the preferred cleaning angle is a scraping angle.

In operation, the cross shaft 32 is mounted at a desired position with respect to the conveyor belt 38 in order to place the scraper blade 102 at the desired cleaning angle with respect to the belt 38. The upper mounting member 52 and the lower mounting member 54 are then placed around the cross shaft 32 and are fastened to one another such that the mounting members 52 and 54 are securely affixed to the cross shaft 32. Alternatively, the mounting lugs 80A and B and the mounting lugs 88A and B can be connected directly to the cross shaft 32 by welding or the like if so desired. The cross shaft 32 is rotated about the axis 36 to engage the scraper blade 102 against the belt 38. Continued rotation of the cross shaft 32 compresses the ram 160 of the gas spring tensioner 46 into the housing 156 such that the ram 160 biases the scraper blade 102 into engagement with the belt 38. Alternatively, the cross shaft 32 can be adjusted linearly to compress the ram 160. The cross shaft 32 is then locked in place such that the cross shaft 32 will not rotate about the axis 36 after the initial desired compression of the gas spring 46. The gas spring tensioner 46 is typically compressed until approximately ten millimeters of the ram 160 is showing.

As shown in FIG. 1, the conveyor belt cleaner 44 includes a new scraper blade 102. The gas spring tensioner 46 exerts a resilient biasing force against the arm member 100 and attempts to pivot the arm and blade assembly 98 in a counterclockwise direction as shown in FIG. 1 about the pivot axis 84. The gas spring tensioner 46 thereby resiliently biases the scraping edge 142 of the scraper blade 102 into engagement with the conveyor belt 38 with a desired amount of force. As the scraping tip 134 of the scraper blade 102 wears due to its engagement with the rotating belt 38, the gas spring tensioner 46 will pivot the scraper blade 102 about the pivot axis 84 into continuing biased engagement with the conveyor belt 38. The gas spring tensioner 46 will bias the scraper blade 102 into continuing engagement with the conveyor belt with approximately the same amount of force over the life of the scraper blade 102. As the inner surface 136 and outer surface 138 of the scraping tip 134 are equally spaced apart from one another, such that the scraping tip 134 has a relatively constant thickness and width, the magnitude of the pressure with which the scraping tip 134 engages the conveyor belt 38 will also remain approximately constant over the wear life of the scraper blade 102.

As best shown in exaggerated scale in FIG. 2, once the scraping tip 134 of the scraper blade 102 has been worn to the point where the scraper blade 102 requires replacement, the stop shaft member 118 of the arm member 100 engages the outer surface of the mounting member 52 to prevent the arm member 100 and scraper blade 102 from pivoting any further in the counter-clockwise direction as shown in FIG. 2 about the pivot axis 84. The stop shaft member 118 thereby prevents the arm member 100 and fastener 150 from being pivoted into engagement with the conveyor belt 38. Once the scraper blade 102 is fully worn as shown in exaggerated scale in FIG. 2, the cross shaft 32 can be rotated about the axis 36 to pivot the conveyor belt cleaner 44 and the scraper blade 102 away from the conveyor belt 38. The fastener 150 can then be removed to allow the removal and replacement of the scraper blade 102.

The pivot axis 84, about which the scraper blade 102 pivots, may be placed in various different positions with respect to the outer surface 40 of the conveyor belt 38 as desired in order to provide a desired cleaning angle between the scraper blade 102 and the outer surface 40 of the belt 38. The scraper blade 102 can be used in a peeling angle or in a scraping angle as desired. The arcuate configuration of the scraper blade 102, and its orientation with respect to the pivot axis 84 about which the scraper blade 102 pivots, provides a constant cleaning angle between the scraper blade 102 and the conveyor belt 38 no matter at what distance the conveyor belt cleaner 44 is mounted from the conveyor belt 38. When the pivot axis 84 is located vertically higher than the point where the central axis 106 intersects the inner surface 136 of the scraper blade 102, the scraper blade 102 is positioned in a positive scraping angle with respect to the conveyor belt 38. When the pivot axis 84 is located vertically lower than the point of intersection between the pivot axis 106 and the inner surface 136 of the scraper blade 102, the scraper blade 102 is positioned at a negative peeling angle with respect to the conveyor belt 38.

FIG. 20 schematically illustrates how the conveyor belt cleaner and tensioning assembly 30 can be selectively positioned with respect to the outer surface 40 of the conveyor belt cleaner 38 to place the scraper blade 102 at the desired cleaning angle with respect to the belt 38. As shown in FIG. 24, the inner surface 136 and scraping edge 142 of the scraper blade 102 are located at a radius A from the pivot axis 84. The inner surface 136 is formed as an arc of a circle having a radius A. The cleaning angle of the scraper blade 102 with respect to the surface 40 of the conveyor belt 38 is the angle D between the surface 40 of the conveyor belt 38 and a plane 176 that extends through the intersection of the scraping edge 142 and the surface 40 and that is tangent to the inner surface 136. The angle E as shown in FIG. 24 is equal to the cleaning angle D. The angle E is between a radius F that extends from the pivot axis 84 to the point of intersection between the scraping edge 142 and the surface 40 of the conveyor belt 38, and a line G that extends through the pivot axis 84 and that is generally perpendicular to the surface 40. The radius A is equal in length to the radius F. As the length of the radius A is known for a particular conveyor belt cleaner and tensioning assembly 30, the distance B at which the pivot axis 84 must be placed from the surface 40 of the conveyor belt 38 to obtain the desired angle E, which corresponds to the desired cleaning angle D, can be determined through trigonometric equations, such as cosine E equals B divided by F. The distance C can also be determined through trigonometric equations such as sine E equals C divided by F. As an example, if the distance B is equal to the distance C, the angle E and the angle D are both equal to 45°.

A plurality of conveyor belt cleaner and tensioner assemblies 30 may be connected to the cross shaft 32 adjacent to one another. As each conveyor belt cleaner 44 has its own conveyor belt cleaner tensioner 46, the failure of one tensioner 46 will not affect the cleaning ability of the remaining conveyor belt cleaners 44 that are mounted on the cross shaft 32.

A modified embodiment of the scraper blade 102 is shown in FIGS. 12A–14A as indicated by the reference number 180. The scraper blade 180 includes a concave inner surface 182 and a convex outer surface 184 that are configured in the same manner as the inner and outer surfaces 136 and 138 of the scraper blade 102. The scraper blade 180 includes a blade base 186 that extends from a first end 188 to a second end 190. The base 186 is preferably made from a metal such as mild steel or stainless steel, but can be made from an elastomeric material such as urethane. One or more wear-resistant scraping elements 192 are attached to the base 186 at the first end 188. The scraping elements 192 form a portion of the inner surface 182. The scraping elements 192 may be made from a wear-resistant material such as tungsten-carbide, or ceramic materials. The scraping elements 192 extend along the base 186 from a first end 194 to a second end 196. The scraping elements 192 extend across the entire width of the scraper blade 180.

A wear-in tip 200 is attached to the first end 194 of the scraping elements 192 and to the first end 188 of the base 186. The wear-in tip 200 includes a scraping edge 202. The wear-in tip 200 also includes a first leg 204 that extends downwardly from the first end 194 of the scraping elements 192 along the inner surface 182. The wear-in tip 200 also includes a second leg 206 that extends downwardly along the outer surface 184 of the base 186. The wear-in tip 200 thereby encloses the first end 194 of the scraping elements 192 and the first end 188 of the base 186. The wear-in tip 200 is preferably formed from a material that is considerably less wear resistant than the material that forms the scraping elements. One preferred material is an elastomeric material such as urethane having a durometer such as 70 Shore D. The urethane material is bonded to the metal scraping elements 192 and metal base 186. The wear-in tip 200 may alternatively be made from a metal material such as bronze or lead, alloys of silver, copper, tin or lead, or materials of low abrasion such as adhesives or filled epoxies. The alloys may be applied as a solder.

FIG. 12A shows the scraper blade 180 positioned at a thirty degree negative cleaning angle with respect to the conveyor belt 38. FIG. 12B illustrates the scraper blade 180 positioned at a forty-five degree negative cleaning angle with respect to the conveyor belt 38. FIG. 13 illustrates the scraper blade 180 positioned at 2.7° positive cleaning angle with respect to the conveyor belt 38. The scraper blade 180 can be used at various other negative or positive cleaning angles as desired.

The wear-in tip 200 of the scraper blade 180 allows the scraper blade 180 to be installed at any cleaning angle and to allow the scraping tip to wear in before the wear-resistant scraping elements 192 engage the conveyor belt 38. The wear-in tip 200 thereby eliminates the potential damage that is sometimes caused to conveyor belts 38 when just a portion of a new scraper blade is engaging the conveyor belt, rather than the whole width of the scraper blade. The wear-in tip 200 of the scraper blade 180 eliminates this problem as the wear-in tip 200 will not damage the belt 38 if the scraper blade 180 is initially misaligned with the belt.

FIG. 14A shows a modified embodiment of the scraper blade 180' wherein the first end 194' of the scraping element 192' is formed in a semi-circular shape, as opposed to a planar shape as shown in FIG. 14. The curved semi-circular shape of the first end 194' is a wear-in tip 200' that will prevent damage to the belt when the first end 194' initially engages the belt, regardless of the angle of attack of the scraper blade 180.

A modified embodiment of the conveyor belt cleaner and tensioner assembly 30 is shown in FIGS. 15–19 as conveyor belt cleaner and tensioner assembly 220. The conveyor belt cleaner and tensioner assembly 220 is adapted to be removably mounted to the cross shaft 32. The conveyor belt cleaner and tensioner assembly 220 includes a conveyor belt cleaner 222, a pair of mounting bases 224A and B and a conveyor belt cleaner tensioner 226. The tensioner 226 is constructed essentially identically to the tensioner 46 and preferably comprises a gas spring tensioner.

The mounting bases 224A and B each include a first generally semi-circular mounting sleeve 230 and a second generally semicircular mounting sleeve 232. The second mounting sleeve 232 includes an outwardly extending lug 234 having a generally circular aperture 236. The second mounting sleeve 232 is removably attached to the first mounting sleeve 230 by a plurality of fasteners 238 in the same manner that the mounting members 52 and 54 are removably attached to one another. The mounting bases 224A and B are stationarily clamped to the cross shaft 32 such that the mounting bases 224A and B do not rotate with respect to the cross shaft 32.

The conveyor belt cleaner 222 includes a mounting base 244, an arm member 246 and a scraper blade 248. The mounting base 244 includes a first generally semi-circular mounting sleeve 250 and a second generally semi-circular mounting sleeve 252. The first and second mounting sleeves 250 and 252 are connected to one another around the cross shaft 32 by fasteners in the same manner as the mounting sleeves 230 and 232. However, the mounting base 244 formed by the connected mounting sleeves 250 and 252 is rotatable with respect to the cross shaft 32.

The arm member 246 has a generally inverted U-shape with opposing side walls. The arm member 246 includes a mounting plate 256 at a first end and is attached at a second end to the second mounting sleeve 252. The scraper blade 248 is removably attached to the mounting plate 256 at the first end of the arm member 246 by one or more fasteners 258. The scraper blade 248 is formed similar to the scraper blade 102. The scraper blade 248 is connected to the arm member 246 and the mounting base 244 such that the center or origin of the radius that forms an arcuate inner surface 260 of the blade 248, and the common center or origin of the radius that forms the arcuate outer surface 262 of the scraper blade 248, are located on the axis 36. The arm member 246 and the scraper blade 248 are pivotal about the central axis 36.

The tensioner 226 is partially located within the U-shaped arm member 246 between the side walls. The tensioner 226 is pivotally connected to the lugs 234 of the mounting bases 224A and B by a pin 266, and the opposite end of the tensioner 226 is pivotally connected to the arm member 246 by a pin 268. The mounting base 244 of the conveyor belt cleaner 222 is located adjacent to and between the mounting bases 224A and B.

FIG. 18 shows the conveyor belt cleaner and tensioner assembly 220 attached to the cross shaft 32 with a new scraper blade 248 in cleaning engagement with the conveyor belt 38. As shown in FIG. 19, as the scraper blade 248 wears, the ram of the gas spring tensioner 226 extends from the housing of the tensioner 226 and pivots the arm member 246 and scraper blade 248 about the axis 36 to maintain the scraper blade 248 in biased engagement with the outer surface 40 of the conveyor belt 38.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A scraper blade for a conveyor belt cleaner including:
   a blade base having a first end, a second end, and a scraping element located at said first end; and
   a wear-in tip attached to said first end of said blade base, said wear-in tip including a scraping edge adapted to engage a conveyor belt, said wear-in tip adapted to prevent damage to the conveyor belt regardless of the angle of attack of said scraper blade.

2. The scraper blade of claim 1 wherein said scraping element is formed from a wear-resistant material and said wear-in tip is formed from a material that is less wear-resistant than said wear-resistant material of said scraping element.

3. The scraper blade of claim 1 wherein said blade base includes a generally arc-shaped inner surface and a generally arc-shaped outer surface.

4. The scraper blade of claim 1 wherein said wear-in tip substantially encloses an outer end of said scraping element.

5. The scraper blade of claim 1 wherein said wear-in tip includes a first leg and a second leg, said first and second legs being disposed on opposite sides of said scraping element.

6. The scraper blade of claim 1 wherein said wear-in tip is formed from an elastomeric material.

7. The scraper blade of claim 1 wherein said wear-in tip is formed from a material selected from the group of low wear-resistant metals consisting of lead, bronze, silver, copper or tin.

8. The scraper blade of claim 1 wherein said blade base includes an aperture having a central axis about which said scraper blade is adapted to pivot and a slot having a pair of side walls which are adapted to limit pivotal movement of said scraper blade.

9. A scraper blade for a conveyor belt cleaner including:
   a blade base;
   a scraping element attached to said blade base, said scraping element including an outer end adapted to engage a conveyor belt, said scraping element being formed from a metal material; and
   a wear-in tip substantially enclosing said outer end of said scraping element, said wear-in tip being formed from a material that is relatively less wear-resistant than said metal material from which said scraping element is formed.

10. The scraper blade of claim 9 wherein said wear-in tip is formed from an elastomeric material.

11. The scraper blade of claim 9 wherein said wear-in tip is formed from a material selected from the group of less wear-resistant metals consisting of lead, bronze, silver, copper or tin.

* * * * *